UNITED STATES PATENT OFFICE.

ALEXANDER H. EGE, OF MECHANICSBURG, PENNSYLVANIA.

ARTIFICIAL FUEL.

1,130,075. Specification of Letters Patent. Patented Mar. 2, 1915.

No Drawing. Application filed March 25, 1913. Serial No. 756,820.

*To all whom it may concern:*

Be it known that I, ALEXANDER H. EGE, a citizen of the United States, and resident of Mechanicsburg, county of Cumberland, State of Pennsylvania, have invented certain new and useful Improvements in Artificial Fuel, of which the following is a specification.

This invention relates to artificial fuels and has for its object the provision of a fuel which utilizes soot, crude petroleum and coal or coke dust.

It is well known that soot accumulates in the flues and other parts of furnaces in which coal is burned and that heretofore this soot has been discarded as a waste product, on account of the fact that no suitable means had been provided for burning the same. Soot consists largely of carbon and therefore can be utilized as a fuel if it is introduced into a furnace in a suitable manner for burning. It is also well known that soot, which is ordinarily in the form of an impalpable powder, is entirely different in its physical characteristics from coal or coke dust, in that it is impervious to or repellent of water to such a degree as not to admit of its being mixed with water to form a plastic compound, which is essential to the formation of briquets. It has therefore been impossible heretofore to make soot into briquets by mixing soot with water and cement as is commonly done in the case of coal dust.

I have discovered that when a small amount of chlorid of sodium is mixed with soot the mixture will take up water readily and therefore makes it possible to form the soot into a plastic mass which can be molded into briquets.

In order to form a binder for the materials entering into the briquets I mix with the soot a small quantity of what is commonly known as Portland cement and I have found that the most effective proportions of the materials are one pound of soot, one eighth of an ounce of chlorid of sodium, two ounces of cement and two ounces of water. In preparing the fuel I thoroughly mix the soot, chlorid of sodium and cement together and then add the water, stirring the mass until the whole is of a uniform constituency. The plastic mass is then molded into briquets of suitable size which are then allowed to solidify, the latter process requiring about forty-eight hours, at ordinary atmospheric temperature, in order to have the briquets sufficiently solid to permit their being handled and used as fuel. The briquets are then immersed in crude petroleum and take up about one part of petroleum to eight parts of the soot. The petroleum adds to the heating value of the fuel and also provides a very convenient means for utilizing the crude petroleum directly in furnaces without employing special forms of burners.

In order to utilize coal or coke dust which is, in most instances of its occurrence, a waste product, I sometimes employ, instead of eight parts of soot, a mixture of six parts of soot and two parts of the coal or coke dust, the soot filling the voids between the particles of coal or coke. Otherwise the fuel is the same as that heretofore described.

It will be understood that when I use the term "coke" in the claims I intend to include also what is commonly known as coal dust.

Having described my invention what I claim is:

1. An artificial fuel consisting of soot, chlorid of sodium, cement and water.
2. An artificial fuel consisting of soot, chlorid of sodium, water and petroleum.
3. An artificial fuel consisting substantially of the following proportions:—eight parts of soot, 1/128 part of chlorid of sodium, one part of cement and one part of water.
4. An artificial fuel consisting of eight parts of soot, 1/128 part of chlorid of sodium, one part of cement, one part of water and one part of petroleum.
5. An artificial fuel containing six parts of soot, two parts of coke, 1/128 part of chlorid of sodium, one part of cement and one part of water.
6. An artificial fuel consisting of six parts of soot, two parts of coke, 1/128 part of chlorid of sodium, one part of cement, one part of water and one part of petroleum.

In testimony whereof I affix my signature in presence of two witnesses.

ALEXANDER H. EGE.

Witnesses:
ELIZABETH C. KAST,
H. M. KAST.

Copies of this patent may be obtained for five cents each, by addressing the "Commissioner of Patents, Washington, D. C."